United States Patent [19]

Bersano

[11] 4,212,543
[45] Jul. 15, 1980

[54] TWIN-SCREW, TWO-STAGE AND MULTI-STAGE EXTRUDER HAVING A DOUBLE FEED

[76] Inventor: Terenzio Bersano, Via Liruti, 12, 33100 Udine, Italy

[21] Appl. No.: 931,194

[22] Filed: Aug. 4, 1978

[30] Foreign Application Priority Data

Aug. 5, 1977 [IT] Italy ............................ 83450 A/77

[51] Int. Cl.³ ............................................. B01F 7/00
[52] U.S. Cl. ........................................ 366/85; 366/86; 425/204
[58] Field of Search .................. 366/83, 85, 84, 86; 425/204, 205

[56] References Cited

U.S. PATENT DOCUMENTS

| 3,572,644 | 3/1971 | Poncet | 366/84 |
| 3,907,259 | 9/1975 | Leclercq | 366/83 |
| 3,963,558 | 6/1976 | Skidmore | 366/83 |

FOREIGN PATENT DOCUMENTS

| 513692 | 9/1952 | Belgium | 425/204 |
| 1079776 | 4/1960 | Fed. Rep. of Germany | 425/205 |
| 1529822 | 1/1972 | Fed. Rep. of Germany | 425/205 |
| 2304088 | 8/1973 | Fed. Rep. of Germany | 425/205 |
| 2502545 | 7/1975 | Fed. Rep. of Germany | 425/205 |
| 2543328 | 3/1977 | Fed. Rep. of Germany | 425/205 |
| 956605 | 2/1950 | France | 425/204 |
| 41-19824 | 11/1966 | Japan | 425/205 |
| 51-23987 | 7/1976 | Japan | 425/205 |

OTHER PUBLICATIONS

Una Nuova Generazione Di Macchine by Moldova SpA.

Primary Examiner—Jay H. Woo
Attorney, Agent, or Firm—Shlesinger, Fitzsimmons & Shlesinger

[57] ABSTRACT

In plastics material extruding installation, a number of layout arrangements of conventional twin-screw extruders with double-feed twin-screw extruders are provided in various combinations in order to solve the problems of a thorough degassing of the plastics material and of an intimate admixture of the several compounding ingredients or raw plastics materials so as to obtain a really homogeneous extrudate.

5 Claims, 8 Drawing Figures

TWIN-SCREW, TWO-STAGE AND MULTI-STAGE EXTRUDER HAVING A DOUBLE FEED

There have been suggested in the recent years a number of two-stage extruders in various constructive embodiments which, however, due both to their high sale prices and to their constructional intricacy, have not met with widespread acceptance on the world market.

Even if, in one's opinion, this is the ideal machine among all the types of extruders, which are now present on the market, it did not enjoy of favourable reception by the manufacturers of plastic articles, above all because the type of mechanical union of the two stages do not permit an effective continuation and control of the gelling or plastification procedure that any plastic material undergoes along the path between the feeding hopper and the extrusion die. Even if both the first stage, which is a twin-screw extruder with double feed and opposite extrusion directions, and the second stage, which is a conventional twin-screw extruder, are known, the subject matter of this invention is the type and the form of union between the first and the second stages. Such a union permits to obtain a novel type of twin-screw, two- or multistage, double-feed extruder. By virtue of the novel type and shape of the union, the twin-screw, two stage extruder in question permits to process any kind of thermoplastic materials while obtaining a thorough degassing, inasmuch as the possibility is afforded of controlling and varying at will the physical conditions of the material or the compound to be extruded, in correspondence with the degassing section. The experience has shown that such an extruder affords the opportunity of obtaining, concurrently with an excellent efficiency, a thorough homogeneousness of the extrudates together with the possibility of admixing materials of different kinds within a wide range, as various components can be introduced at pre-established points having certain pressures and temperatures (especially in the multistage version embodied with the same type and shape of interstage union).

In order that the embodiments of the twin-sceew, two-stage version, as well as that of the twin-screw, multistage version, may be better understood, reference is made to the accompanying drawings, wherein.

Figure 1:
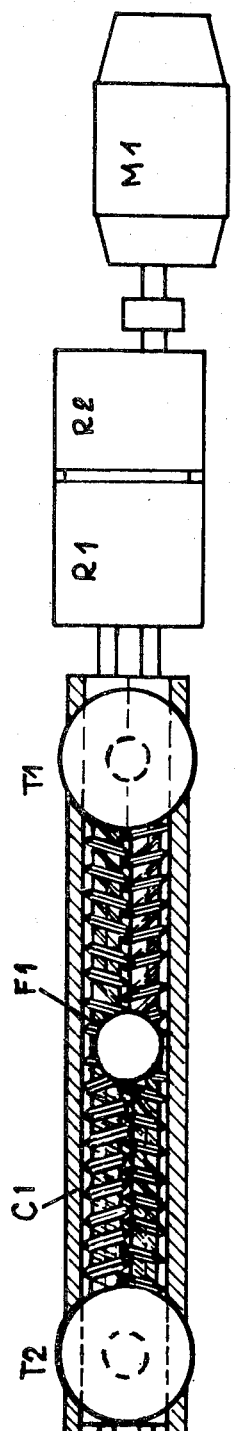
FIG. 1 is a fragmentary plan view, partially in section, of a twin-screw, double-feed extruder having opposite extrusion directions, and made according to one embodiment of this invention.
Figure 4:
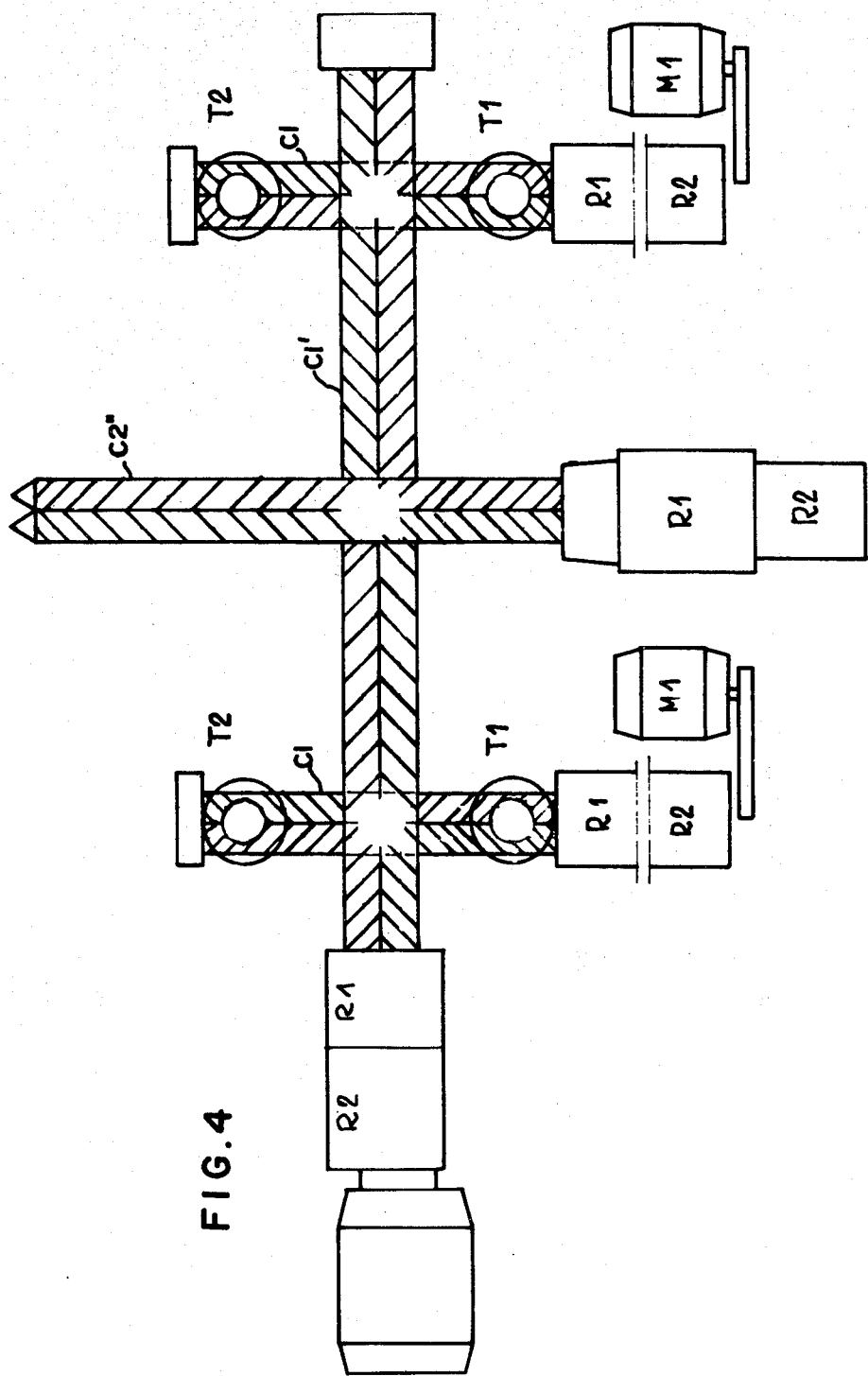
Figure 5B:
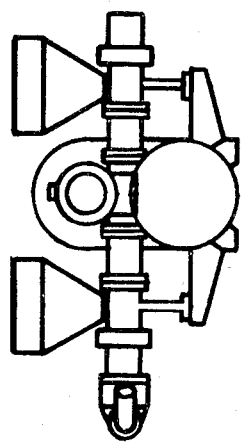
Figure 5A:
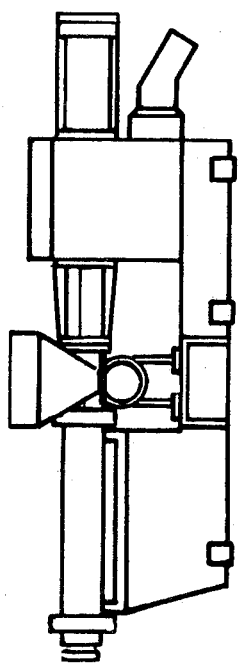
Figure 5C:
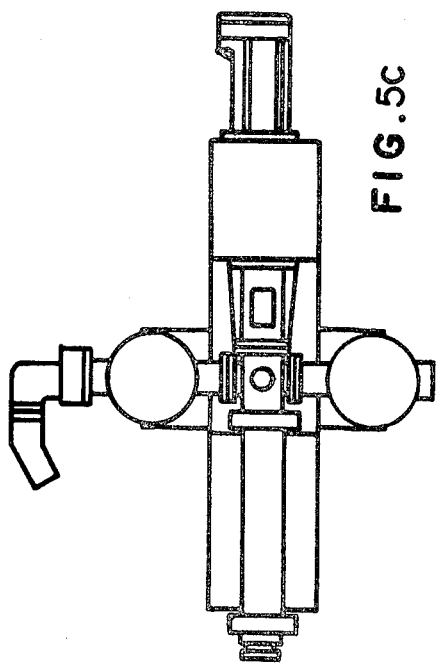

FIG. 4 is a plan view, partially in section, illustrating diagrammatically a multi-stage extruder comprising an elongate extruder of the type shown in FIG. 1, which is fed by two similar, transversely extending extruders, and in turn feeds a conventional twin-screw extruder; and FIGS. 5A, 5B, and 5C are side elevation, end elevation and plan views, respectively, of twin-screw, two stage extruder completely assembled.

Referring now to the drawings, the first or feeder stage with twin-screw and double feed and opposite extrusion directions is shown in FIG. 1. The feed of the material(s) is carried out through the hoppers, T1 and T2, whereas the extrusion of the materials takes place centrally through the bore F1 formed through the barrel C1.

The reduction and drive transfer gearbox and the thrust absorbing unit are diagrammatically indicated at R1, R2.

The rotary drive is impressed either by a variable-speed motor, M1, or by a combined asynchronous motor-multispeed change gear, or by a hydraulic mover.

The second stage (FIGS. 2 and 2A) is a conventional twin-screw extruder having a barrel C2 which is preferably fed from below by a twin-screw, double feed extruder of the type on FIG. 1. The barrel C1 of this twin-screw, double feed extruder with opposite directions of extrusion receives the material (s) from the hoppers T1, T2. The two screws convey with their rotary motion the material in barrel C1 towards the central point F1 wherefrom, through a variable-cross-section bore formed by interchangeable members D, the material is introduced from below, upwardly into the barrel C2 of the second stage. The screws of the second stage draw the pre-gelled material from the first stage, and, with their rotary motions, convey it forward towards the extrusion head H.

In the top section of the barrel C2 (in the case of feed from below), and in registry with the bore F1 for the introduction of the pre-gelled material from the first stage, the degassing port G is provided.

Stated otherwise, the material is heated and pre-gelled in the first stage barrel C1 and is introduced into the second stage barrel C2 and is concurrently degassed and then compounded, gelled and extruded through head H by the second stage.

The variable speeds of the screws of the first and the second stages, and the variable cross-sectional area afforded by members D in the transfer bore from the first to the second stage, permit the apparatus to carry the material to the area of union between the first and the second stage under the desired pressure and temperature conditions, whereas the variable speeds of the screws of the second stage permit the apparatus to maintain, in correspondence with the transfer bore, a constant static pressure of the material, and to carry out a complete degassing operation.

Figure 2:
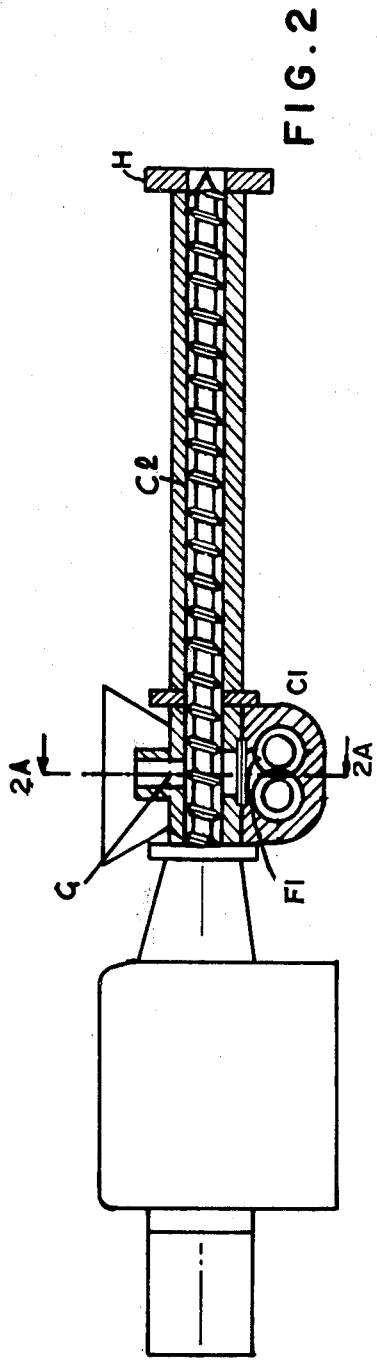
FIG. 2 is a side elevational view of a two stage extruder showing, partially in section, a conventional twin screw extruder as the second stage being fed from beneath by the first stage, which is a twin-screw, double-feed extruder of the type shown in FIG. 1.
Figure 2A:
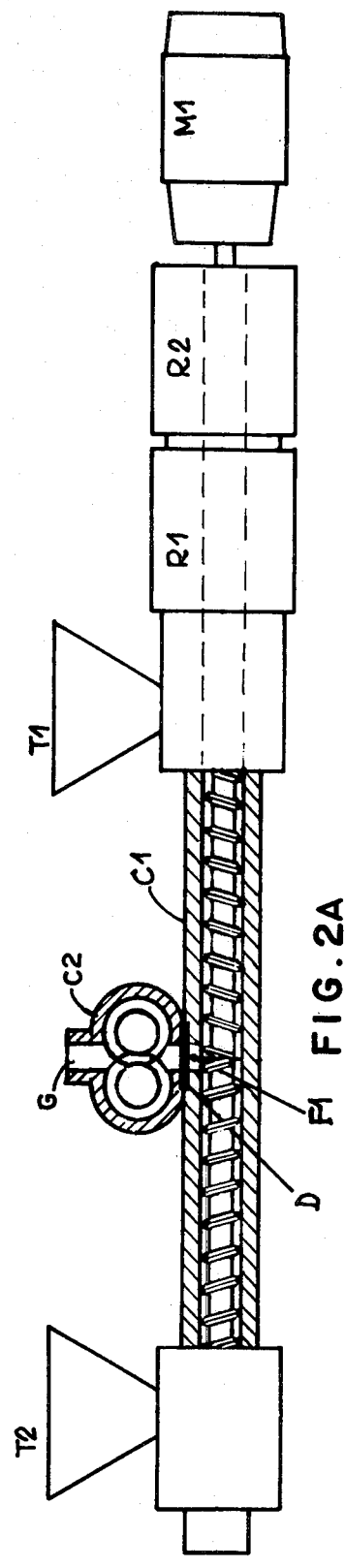
FIG. 2A is a sectional view taken along the line 2A—2A in FIG. 2 looking in the direction of the arrows.
Figure 3:
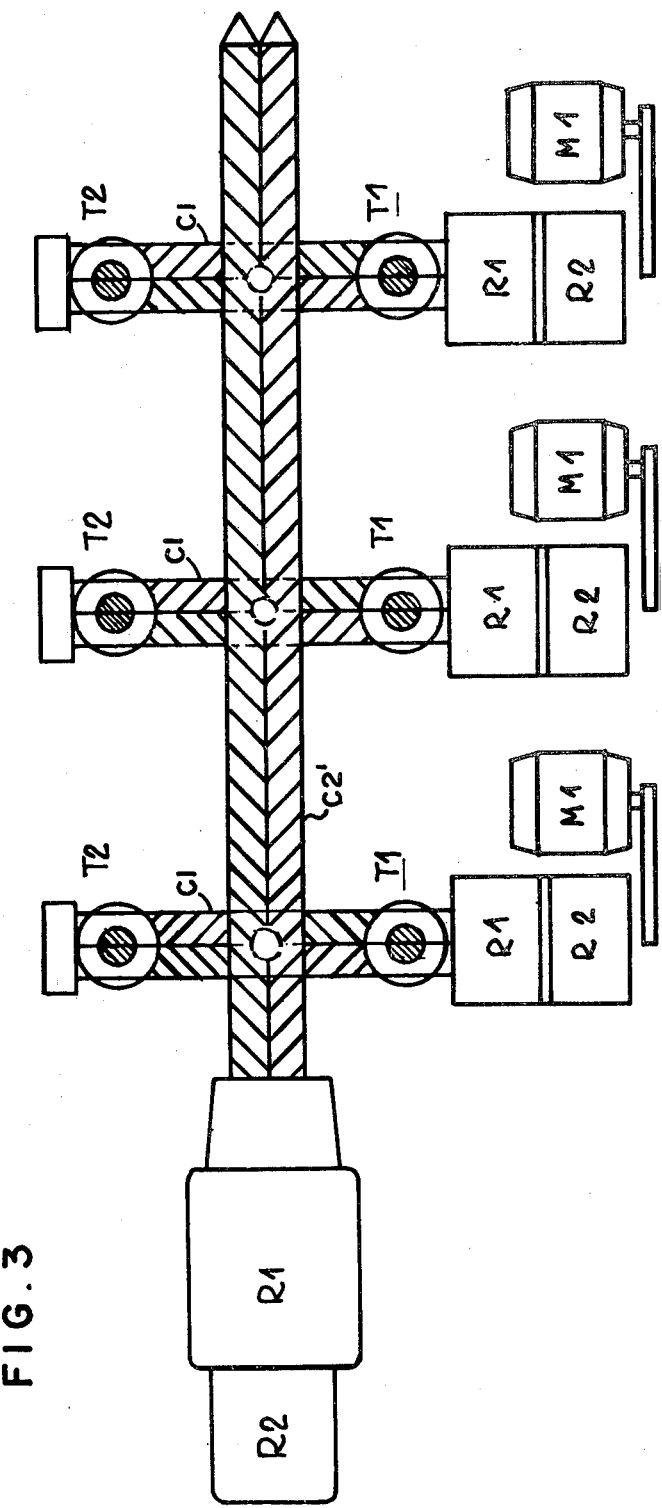
FIG. 3 is a plan view, partially in section, and illustrating diagrammatically how several extruders of the type shown in FIG. 1 may be connected to a conventional twin-screw extruder to form another type of multi-stage twin-screw extruder.

As shown in FIG. 3 it is possible to connect the barrels C1 of a plurality (three in the embodiment shown) of contrary-extrusion-direction extruders of the type shown in FIG. 1 to registering ports in the underside of the barrel C2' of a conventional twin-screw extruder generally similar to that described in connection with FIGS. 2 and 2A, thereby to form a multi-stage twin screw extruder.

Still another multi-stage embodiment is shown in FIG. 4, wherein a plurality (two) of contrary-extrusion-direction extruders have the discharge ports in their barrels C1 connected to the two axially spaced intake ports formed in the underside of the barrel C1' of a modified contrary-extrusion-direction extruder, which then feeds the incoming materials in opposite directions toward a central discharge port in C1' which is connected to an inlet port in the underside of the barrel C2'' of another type of conventional twin-screw extruder which produces the final, extruded product.

FIGS. 5A, 5B, and 5C show in the three views a possible embodiment of an extruder of the twin-screw, two-stage kind actuated by hydraulic movers.

Having thus described my invention, what I claim is:

1. A multi-stage, twin-screw extruder mechanism, comprising
    a first twin-screw extruder including a first barrel having therein two axially spaced inlet openings for receiving materials to be extruded, a discharge port positioned between said spaced inlet openings, a first set of twin-screws rotatable in said first barrel for feeding said materials in opposite directions from said inlet openings to said discharge port,
    a second twin-screw extruder including a second barrel extending transversely of said first barrel, said second barrel having an inlet port registering with the discharge port of said first barrel,
    means coupling the discharge port of said first barrel to the inlet port of said second barrel to convey said materials from said discharge port to said inlet port,
    a second set of twin screws rotatable in said second barrel to draw said materials received from the discharge port of said first barrel, and to feed said materials in one direction and through an extrusion head at one end of said second barrel, and
    means for driving said first and second sets of twin screws at variable speeds,
    said coupling means including adjustable means cooperating with said driving means to cause said materials to be maintained under the desired pressure and temperature conditions as they pass from said first to said second barrel.

2. A multi-stage, twin-screw extruder mechanism as defined in claim 1, wherein said second barrel is positioned above said first barrel, whereby said materials are fed upwardly through said coupling means from the discharge port of the first barrel to the inlet port of the second barrel.

3. A multi-stage, twin-screw extruder mechanism as defined in claim 1, wherein said adjustable means is operable for selectively varying the cross-sectional configuration of the passage connecting the discharge port of said first barrel with the inlet port of said second barrel, and comprises interchangeable bore members positioned between said ports, whereby the apparent specific gravity or degree of compactness of the materials to be extruded can be modified by varying the cross-sectional configuration of said passage.

4. A multi-stage, twin-screw extruder mechanism as defined in claim 1, including at least one further extruder, which is similar to said first extruder, connected to said second extruder to feed materials from a discharge port in said further extruder to a second inlet port in said second extruder.

5. A multi-stage, twin-screw extruder mechanism as defined in claim 1, including two further extruders, similar to said first extruder, and having their discharge ports connected to said spaced inlet openings in said first extruder, whereby materials from said two further extruders are fed through said first extruder in opposite directions to said second extruder.

* * * * *